United States Patent [19]

Washington

[11] Patent Number: 5,345,714
[45] Date of Patent: Sep. 13, 1994

[54] PLANT SEPARATION DEVICE

[76] Inventor: John W. Washington, 4667 Ranch Dr., Colorado Springs, Colo. 80918

[21] Appl. No.: 99,527

[22] Filed: Jul. 30, 1993

[51] Int. Cl.$^5$ ............................................. A01G 9/12
[52] U.S. Cl. ............................................. 47/70; 47/66
[58] Field of Search ............................... 47/66, 66 D, 70

[56] References Cited

U.S. PATENT DOCUMENTS

| 515,032 | 2/1894 | Vestal | 47/66 D |
| 2,026,679 | 1/1936 | Higgins | 47/66 D |

FOREIGN PATENT DOCUMENTS

| 547677 | 3/1931 | Fed. Rep. of Germany | 47/66 D |
| 3727463 | 5/1988 | Fed. Rep. of Germany | 47/66 D |
| 815709 | 7/1937 | France | 47/66 D |
| 599030 | 10/1959 | Italy | 47/66 D |
| 2253126 | 9/1992 | United Kingdom | 47/70 |

Primary Examiner—Henry E. Raduazo
Attorney, Agent, or Firm—E. Michael Combs

[57] ABSTRACT

A mounting plate having a central shaft fixedly and coaxially mounted to the shaft is arranged for reception within a pot member and with the mounting plate positioned on the pot floor spaced therefrom by a plurality of support feet. In this manner, the central shaft may be manually grasped for the lifting of the mounting plate from the pot effecting separation of a plant positioned upon the mounting plate from the associated pot.

5 Claims, 4 Drawing Sheets

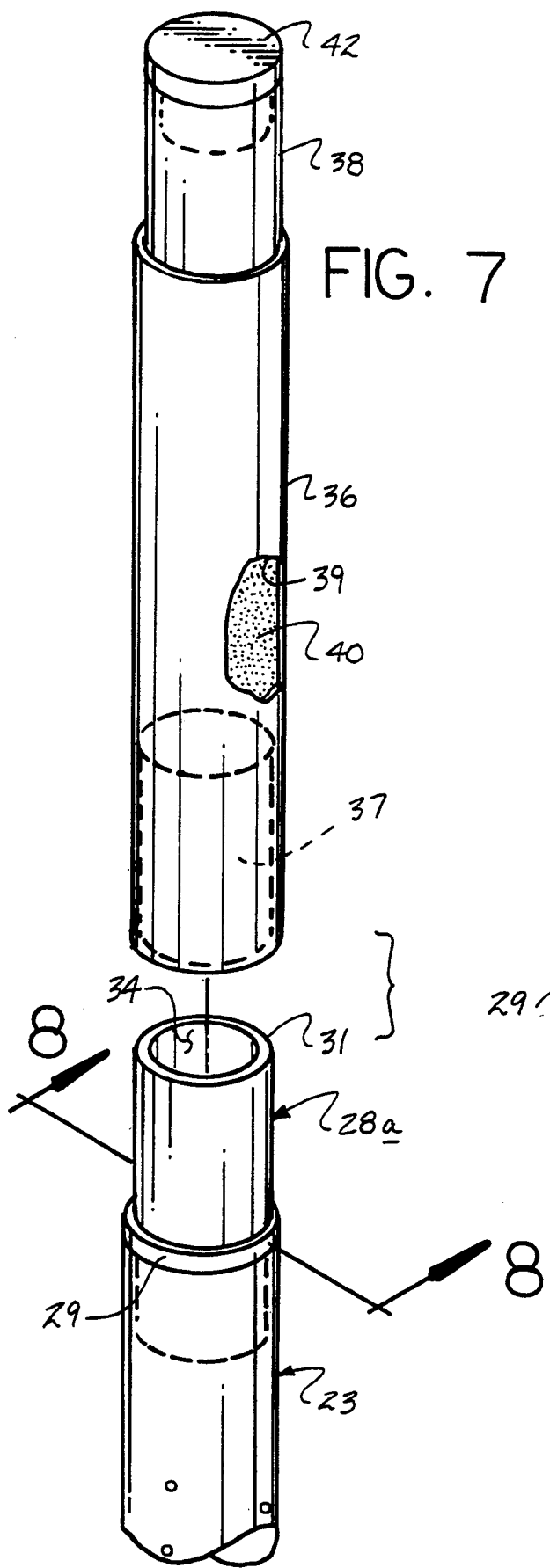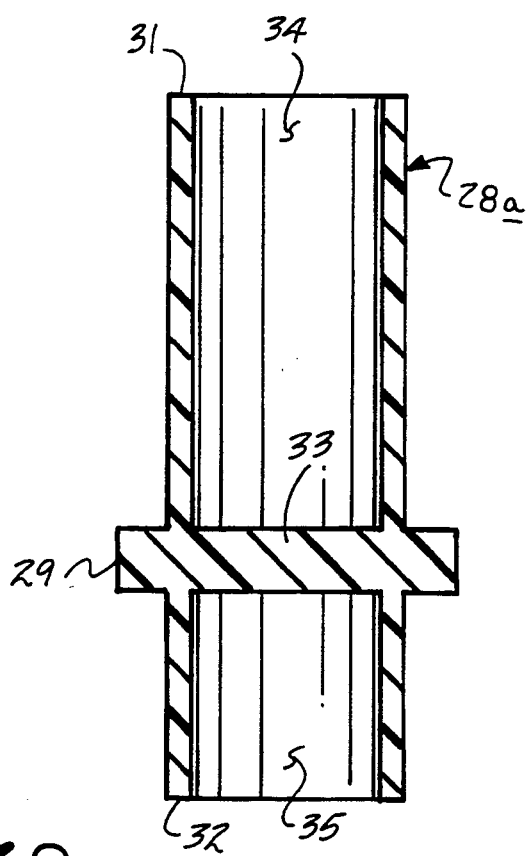

PLANT SEPARATION DEVICE

BACKGROUND OF THE INVENTION

1. Field of the Invention

The field of invention relates to plant and root separation structure, and more particularly pertains to a new and improved plant separation device wherein the same is arranged for ease of separation of a plant relative to an associated pot permitting ease of transferring of the plant.

2. Description of the Prior Art

The separation of seedlings and the like, as well as mature plants relative to existing pot structure, may impart damage to root system of an associated plant. The instant invention attempts to overcome deficiencies of the prior art by providing for an effective organization permitting removal of a plant relative to a pot for transference from that pot.

Prior art plant root extraction structure is indicated in U.S. Pat. No. 3,976,282 indicating a tool member arranged to effect removal of a plant relative to an existing pot utilizing a fulcruming tool for that purpose.

U.S. Pat. No. 3,830,015 sets forth a root separator having compartments within the associated pot structure to permit ease of separation of the plant into various rooted cell portions.

SUMMARY OF THE INVENTION

In view of the foregoing disadvantages inherent in the known types of plant separation apparatus now present in the prior art, the present invention provides a plant separation device wherein the same is arranged to include a mounting plate having a central shaft, wherein the central shaft is grasped for ease of separation of the mounting plate and shaft relative to an existing pot member. As such, the general purpose of the present invention, which will be described subsequently in greater detail, is to provide a new and improved plant separation device which has all the advantages of the prior art plant separation apparatus and none of the disadvantages.

To attain this, the present invention provides a mounting plate having a central shaft fixedly and coaxially mounted to the shaft is arranged for reception with a pot member and with the mounting plate positioned on the pot floor spaced therefrom by a plurality of support feet. In this manner, the central shaft may be manually grasped for the lifting of the mounting plate from the pot effecting separation of a plant positioned upon the mounting plate from the associated pot.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved plant separation device which has all the advantages of the prior art plant separation apparatus and none of the disadvantages.

It is another object of the present invention to provide a new and improved plant separation device which may be easily and efficiently manufactured and marketed.

It is a further object of the present invention to provide a new and improved plant separation device which is of a durable and reliable construction.

An even further object of the present invention is to provide a new and improved plant separation device which is susceptible of a low cost of manufacture with regard to both materials and labor, and which accordingly is then susceptible of low prices of sale to the consuming public, thereby making such plant separation devices economically available to the buying public.

Still yet another object of the present invention is to provide a new and improved plant separation device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the extension shaft arranged for mounting to the central shaft.

FIG. 8 is an orthographic view, taken along the lines 8—8 of FIG. 7 in the direction indicated by the arrows.

DESCRIPTION OF THE PREFERRED EMBODIMENT

Figure 1:
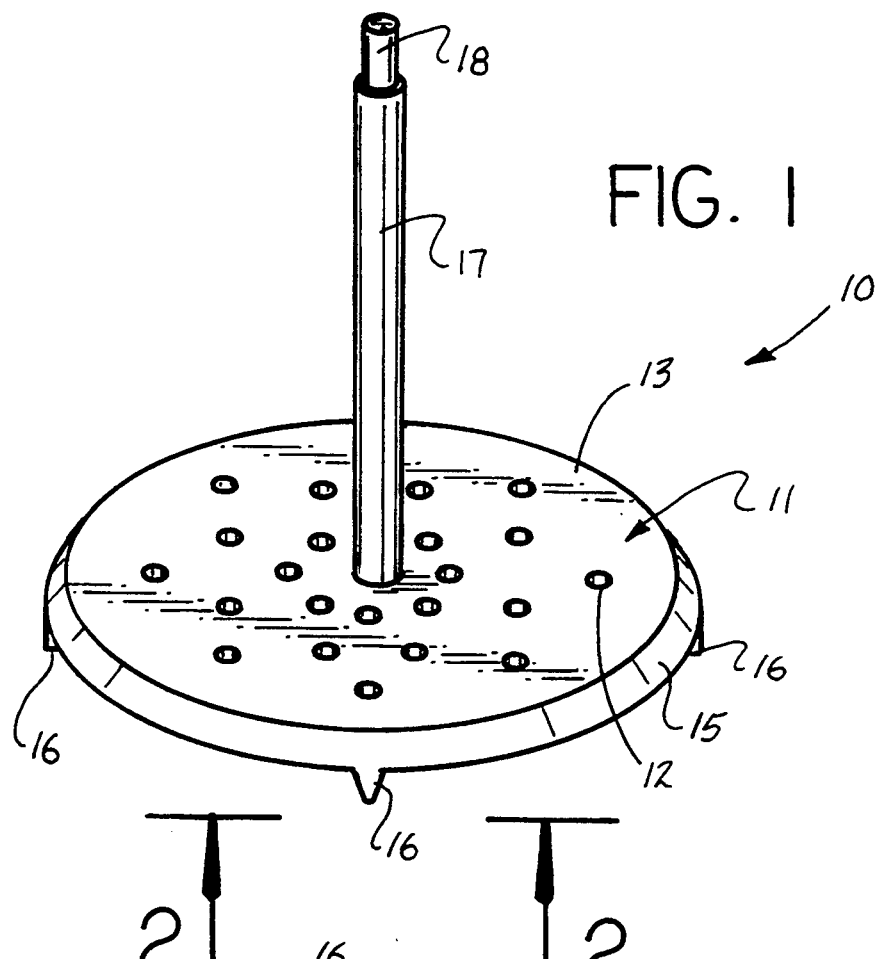
FIG. 1 is an isometric illustration of the invention.
Figure 2:
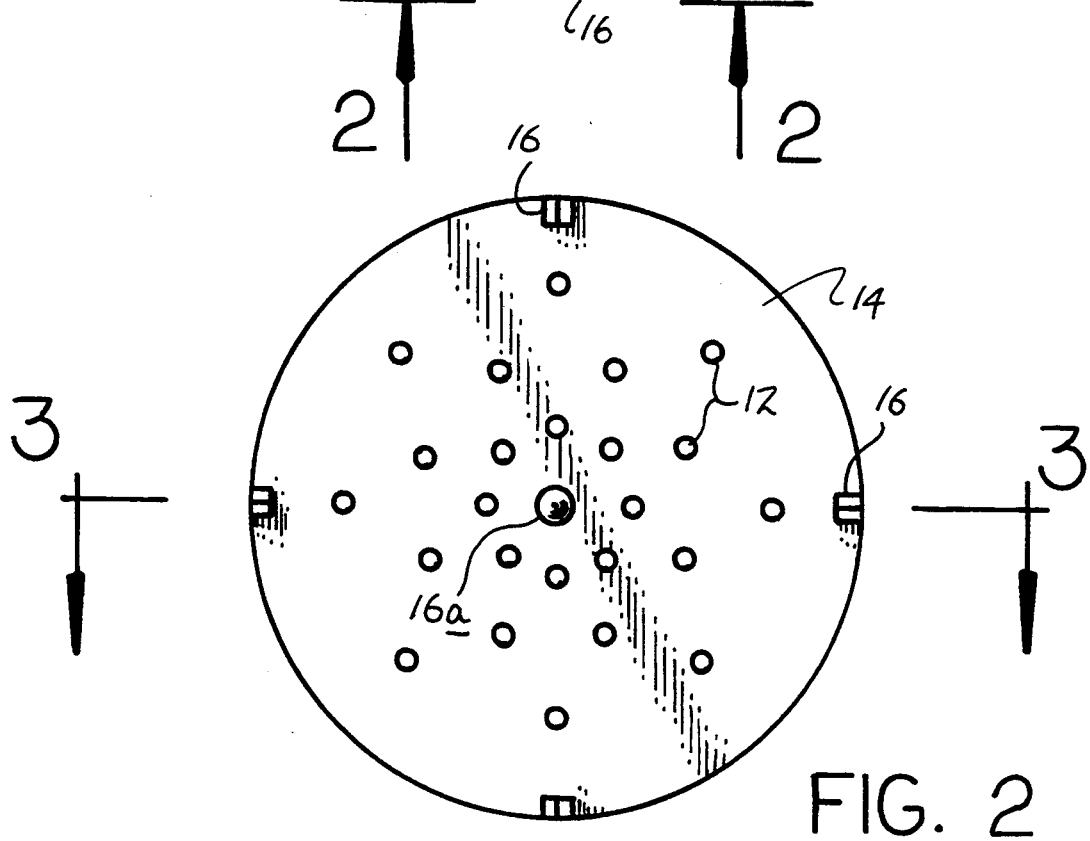
FIG. 2 is an orthographic view, taken along the lines 2—2 of FIG. 1 in the direction indicated by the arrows.
Figure 3:
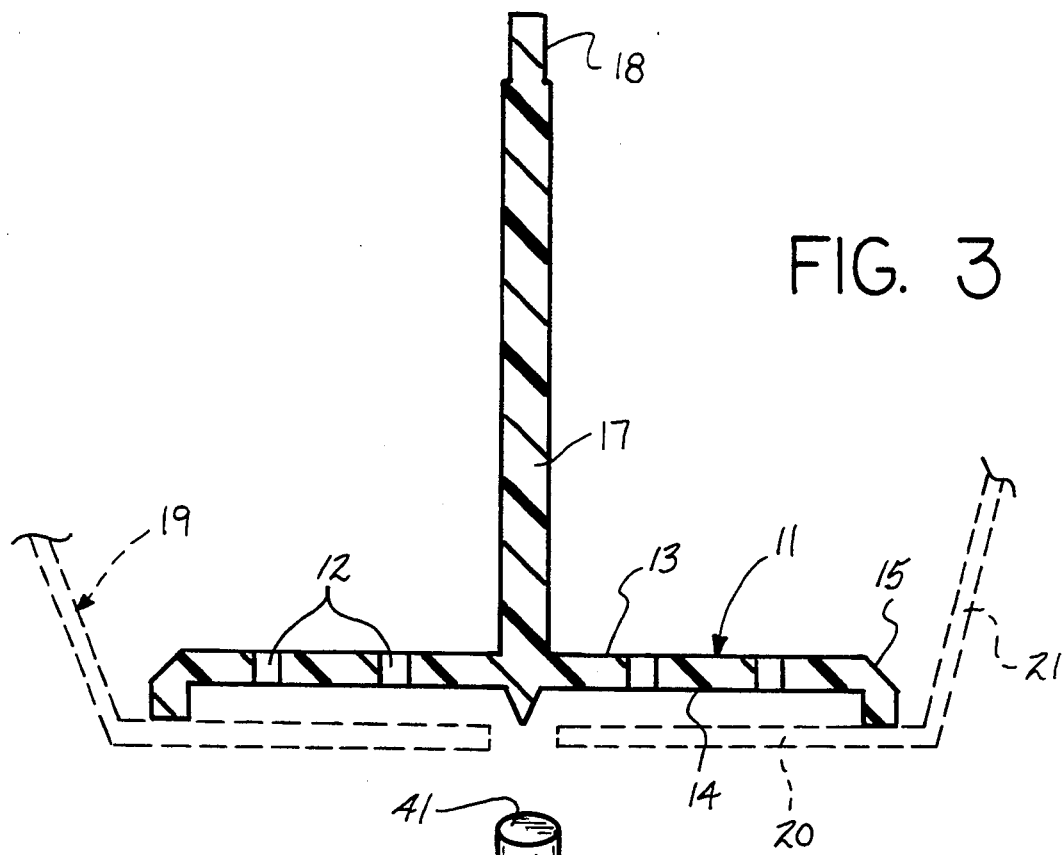
FIG. 3 is an orthographic view, taken along the lines 3—3 of FIG. 2 in the direction indicated by the arrows.
Figure 4:
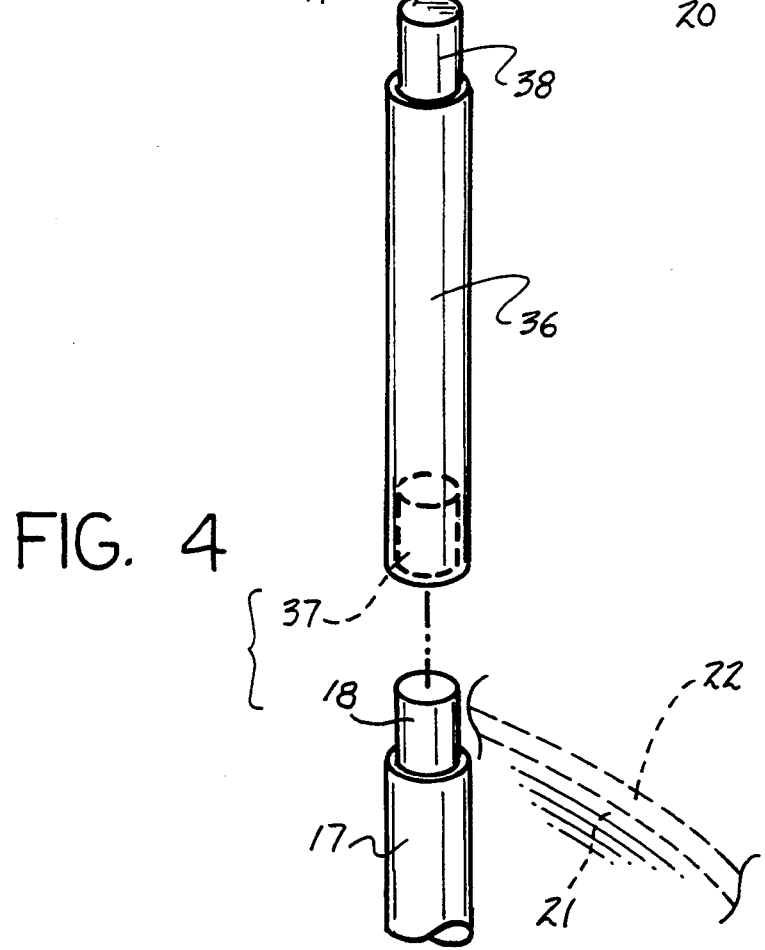
FIG. 4 is an isometric illustration of an extension shaft for use by the invention.

With reference now to the drawings, and in particular to FIGS. 1 to 8 thereof, a new and improved plant separation device embodying the principles and concepts of the present invention and generally designated by the reference numeral 10 will be described.

More specifically, the plant separation device 10 of the instant invention essentially comprises a mounting plate 11 having a matrix of apertures 12 directed therethrough extending from the mounting plate top wall 13 through to a mounting plate bottom wall 14, with the top wall 13 of a first diameter, the bottom wall 14 of a second diameter, with the bottom wall second diameter greater than said first diameter such that a peripheral side wall of a truncated conical configuration is canted from the top wall 13 to the bottom wall 14 permitting ease of removal of the mounting plate when positioned within a planting pot 19, having a planting pot floor 20 receiving the mounting plate 11. The planting pot side wall 21 in cooperation with the mounting plate side wall 15 permits ease of separation of soil otherwise captured between the mounting plate and the planting pot side wall 21. The mounting plate bottom wall 14 is indicated to include an annular array of support feet 16 fixedly mounted to the bottom wall 14 at the peripheral side wall 15, as well as a central support foot 16a (see FIG. 2) providing rigid support of the organization in use. A central shaft 17 is provided orthogonally mounted medially of the mounting plate 11 extending from the top wall 13 terminating in a central shaft projection 18, having a second width less than a first width defined by the central shaft to accommodate an extension shaft 36 (see FIG. 4) to extend the extension shaft 36 beyond the side wall entrance end 22. The extension shaft 36 includes a socket 37 at its lowermost end to receive the central shaft projection 18 therewithin coaxially aligning the central shaft 36 relative to the central shaft to accommodate various climbing plants beyond the pot 19. The extension shaft terminates in a projecting shaft 38 to accommodate further extension shaft members thereon.

Figure 5:
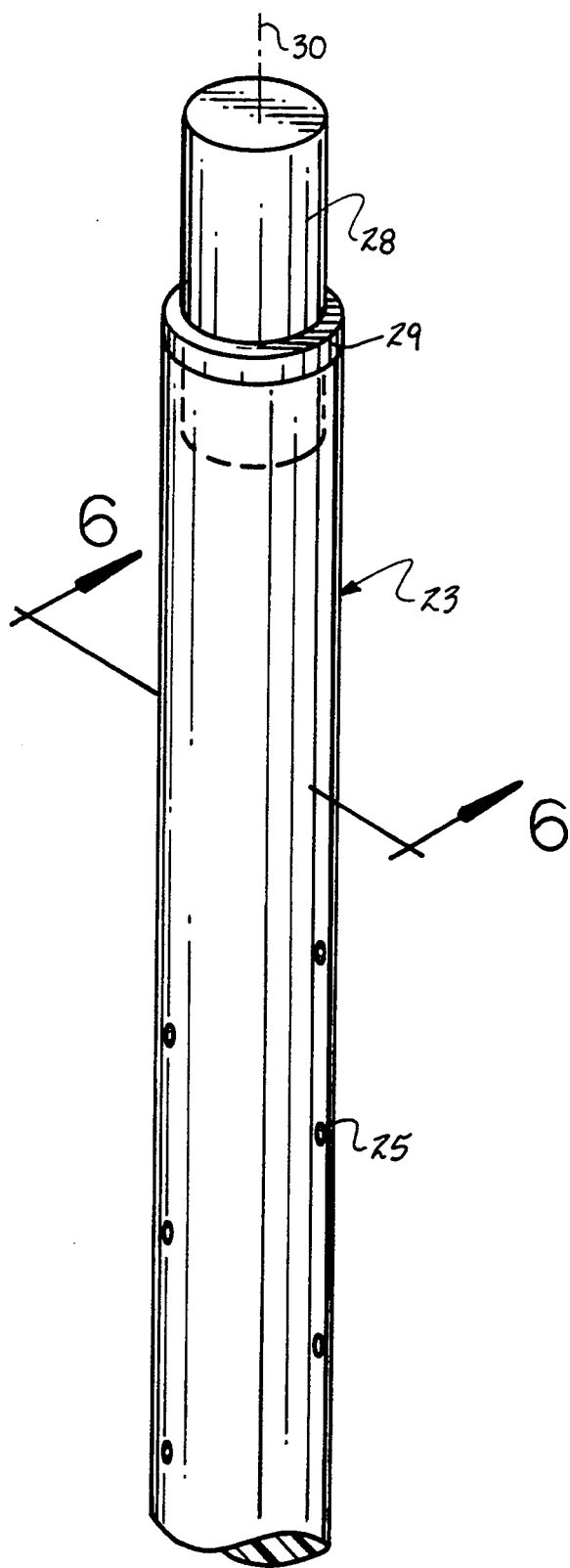
FIG. 5 is an isometric illustration of a modified central shaft structure.
Figure 6:
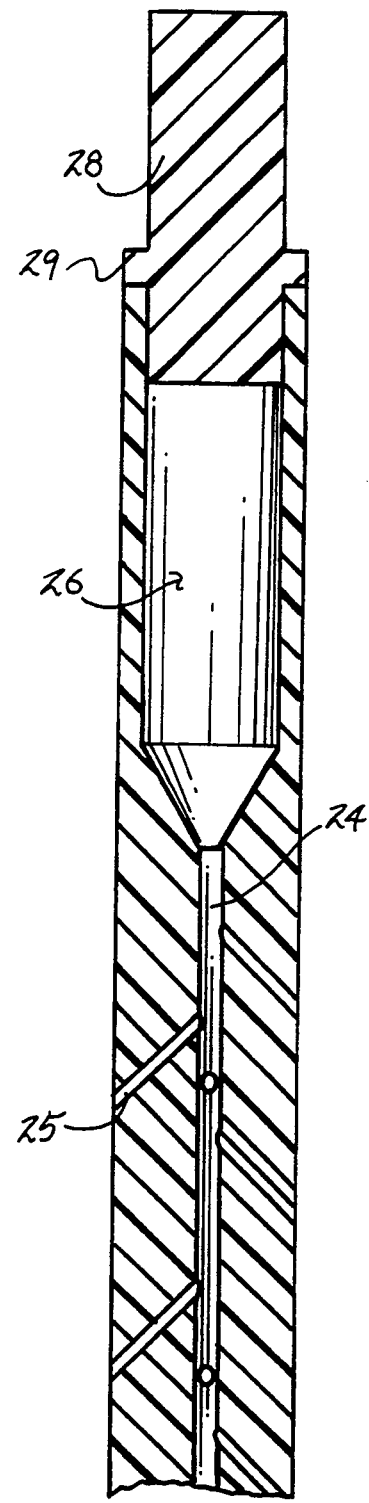
FIG. 6 is an orthographic view, taken along the lines 6—6 of FIG. 5 in the direction indicated by the arrows.

The FIGS. 5 and 6 indicates the use of a modified central shaft 23, having a central conduit 24 coaxially oriented relative to the modified shaft 23, wherein feed ports 25 extend in fluid communication with the central shaft 24 to the exterior side wall of the modified shaft 23 to permit the feeding of various nutrients and fluids into the pot 19 when the organization is positioned therewithin. A reservoir cavity 26 directed into the modified shaft 23 from the uppermost end thereof provides for the accommodation of a quantity of fluid and the like therewithin. A modified projection 28 including an abutment flange 29 to engage the uppermost end of the modified shaft and coaxially orient the modified projection 28 to simultaneously plug the reservoir cavity 26, as well as provide for the accommodation of an extension shaft 36 thereon.

The FIGS. 7 and 8 indicates the extension shaft 36 having an extension shaft cavity 39 extending from the projecting shaft opening 41 that is in communication with the extension shaft cavity 39 that accommodates a fertilizer 40 and the like therewithin. The use of a further projection member 28a is arranged such that the annular flange 29 includes a central web 33 dividing a first cavity 34 directed into a first end of the projection 28a, having a first volume to accommodate a first quantity of the fertilizer 40 with a second cavity 35 directed into a second end 32 relative to the first end 31 of the projection 28a. The first and second cavities 34 and 35 having respective first and second cavities accommodate measuring of a plurality of volumes of the fertilizer 40 to permit the modified projection 28a for use as a measuring device. A cap member 42 is received onto the projecting shaft opening 41 providing access into the shaft cavity 39 for use of the fertilizer 40 as desired.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A plant separation device for reception within a planting pot, wherein the device comprises, a mounting plate, the mounting plate having a top wall spaced from a bottom wall, with the mounting plate including a matrix of apertures directed through the mounting plate extending from the top wall through the bottom wall, and a shaft member fixedly and orthogonally mounted to the top wall medially of the mounting plate, and the mounting plate includes a peripheral side wall of a truncated conical configuration, wherein the top wall is of a first diameter, the bottom wall of a second diameter, with the second diameter greater than the first diameter permitting ease of extraction of the mounting plate relative to the planting pot, and the bottom wall includes a plurality of support feet fixedly mounted to the bottom wall arranged to space the mounting plate bottom wall from a planting pot floor of the planting pot.

2. A device as set forth in claim 1 wherein the shaft member includes a shaft projection, the shaft member of a first width and the shaft projection of a second width less than the first width, and an extension shaft, the extension shaft including an extension shaft first end and an extension shaft second end, the extension shaft first end including a socket directed therein to receive the shaft projection coaxially aligning the extension shaft relative to the shaft member, and the shaft second end including a projecting shaft.

3. A device as set forth in claim 2 wherein the shaft member includes an entrance opening having a reservoir cavity, and a central conduit coaxially aligned relative to the reservoir cavity directed through the shaft member, with a plurality of feed ports in fluid communication with the central conduit extending to an exterior surface of the shaft member, and the shaft projection including an annular flange arranged for engaging the central shaft, with the shaft projection including a shaft projection portion received within the reservoir cavity, with the shaft projection coaxially aligned relative to the reservoir cavity.

4. A device as set forth in claim 3 wherein the shaft projection further includes a central web, and a projection first end and a projection second end, the projection first end including a first cavity directed into the projection, and a second cavity directed into the second end of the projection, with the first cavity and the second cavity separated by said central web, wherein the first cavity has a first volume, the second cavity has a second volume, with the first volume greater than the second volume for use in measuring fertilizer within the first cavity and the second cavity.

5. A device as set forth in claim 4 wherein the extension shaft includes a projecting shaft opening directed into the projecting shaft of the extension shaft, and the extension shaft including an extension shaft cavity extending from the projecting shaft opening in a spaced relationship relative to the extension shaft socket for receiving said fertilizer within the extension shaft cavity, and a cap member, the cap member arranged for reception within the projecting shaft opening.

* * * * *